United States Patent [19]
Toman

[11] Patent Number: 5,954,405
[45] Date of Patent: Sep. 21, 1999

[54] AIR GUIDING ARRANGEMENT FOR COOLING VEHICLE WHEEL BRAKE

[75] Inventor: Vilem Toman, Wiernsheim, Germany

[73] Assignee: Dr. Ing. h.c.F. Porsche AG, Weissach, Germany

[21] Appl. No.: 08/762,809

[22] Filed: Dec. 9, 1996

[30] Foreign Application Priority Data

Dec. 9, 1995 [DE] Germany ........................... 195 46 064

[51] Int. Cl.[6] .................................................. F16D 65/78
[52] U.S. Cl. ..................................... 301/6.3; 188/264 AA; 296/180.1
[58] Field of Search ........................... 301/6.1, 6.3, 6.91; 188/264 AA, 264 A; 296/180.1; 180/903

[56] References Cited

U.S. PATENT DOCUMENTS

| 4,591,285 | 5/1986 | Nelson . | |
| 4,744,606 | 5/1988 | Yoshida | 301/6.3 |
| 4,805,747 | 2/1989 | Moedinger et al. | 188/264 AA X |
| 4,979,597 | 12/1990 | Mehlitz | 188/264 AA X |

FOREIGN PATENT DOCUMENTS

| 0276640A1 | 8/1988 | European Pat. Off. . |
| 031888A1 | 9/1989 | European Pat. Off. . |
| 0331888A1 | 9/1989 | European Pat. Off. . |
| 4214912A1 | 11/1993 | Germany . |
| 41231 | 2/1991 | Japan ............................. 188/264 AA |

OTHER PUBLICATIONS

Search Report Mar. 27, 19979, Europe.

*Primary Examiner*—Russell D. Stormer
*Attorney, Agent, or Firm*—Evenson, McKeown, Edwards & Lenahan, PLLC

[57] ABSTRACT

An air guiding arrangement for cooling wheel brakes consists of a profiled plastic elastic deflection element which is set against the arriving air flow and which is held on the vehicle side on an axle component, such as a wheel link by way of at least one hook-in connection and which guides the air flow to the brake.

16 Claims, 2 Drawing Sheets

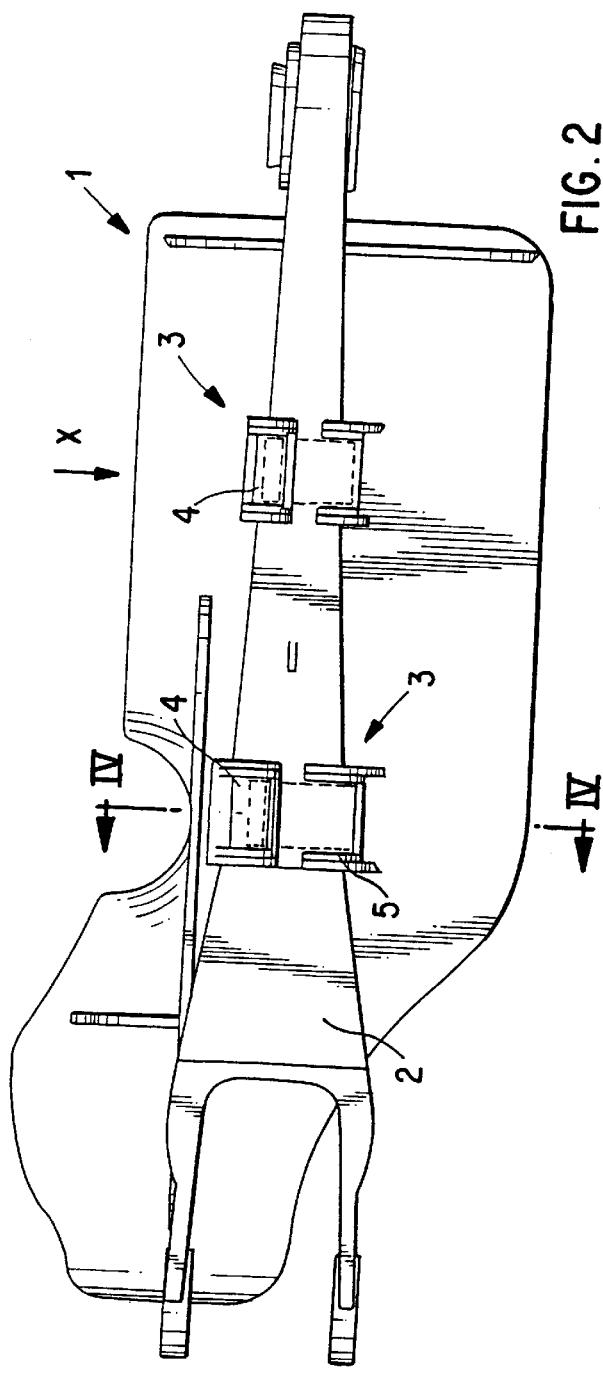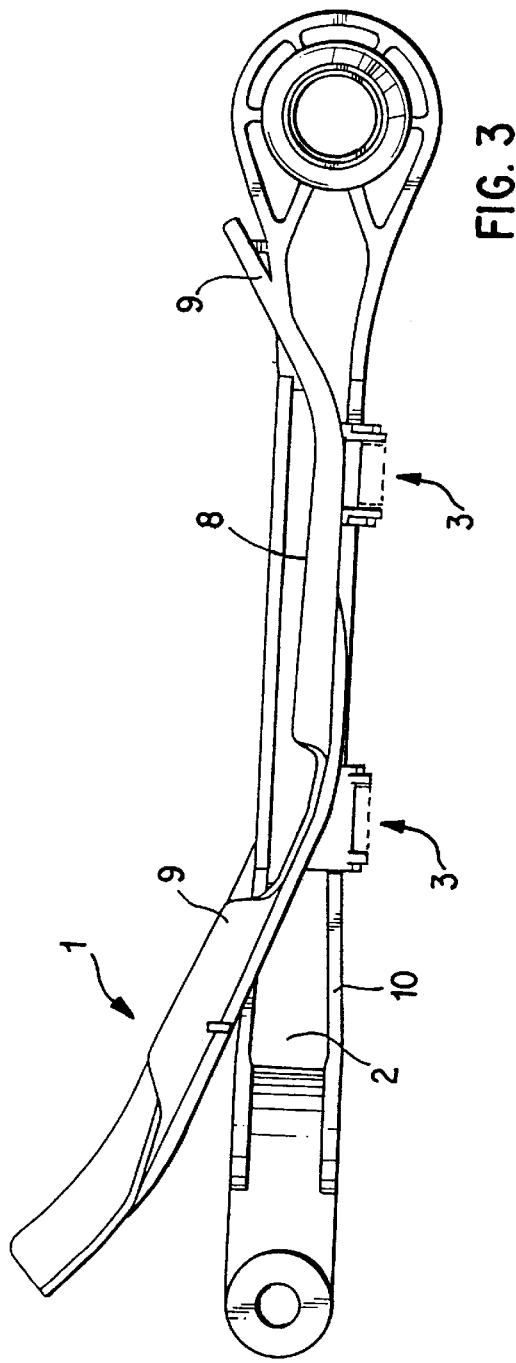

AIR GUIDING ARRANGEMENT FOR COOLING VEHICLE WHEEL BRAKE

BACKGROUND AND SUMMARY OF THE INVENTION

This invention relates to an air guiding arrangement for cooling wheel brakes.

From European Patent Document EP 0 331 888 A1, an air guiding arrangement is known which is held on a wheel link by means of a fastening arrangement. This fastening arrangement comprises screwing devices which are connected with the wheel link.

It is an object of the invention to provide an air guiding arrangement which can be fastened by means of a simple mounting method on an axle component or on a wheel link.

According to the invention, this object is achieved by providing an air guiding element with at least one molded hook in connection for fastening to a wheel link.

Principal advantages achieved by means of the invention are that the air guiding element is to be detachably fastened to the wheel link by way of a molded-on hook-in connection without any screwing devices.

The air guiding element consists essentially of a plastic part to which the hook-in connections are molded. Depending on the length of the air guiding element, one hook-in connection or several hook-in connections can be used.

The hook-in connection comprises holding lugs reaching around the wheel link, in which case one holding lug is connected with a closing tongue which can be hooked into an opening of the other holding lug and the air guiding element can therefore be fastened to the wheel link.

For connecting the air guiding element to the wheel link, the flexibly or elastically constructed air guiding element is therefore bent open so far in the longitudinal direction that the holding lugs permit an introducing of the wheel link so that the wheel link can be placed into a longitudinally extending opening. By way of end-side sections of the air guiding element, a supporting or contact bearing of the wheel link will then take place.

The holding lugs are constructed such that they firmly reach around the wheel link inserted into the opening and a securing takes place by way of a closing tongue which can be locked in one of the holding lugs. The air guiding element is therefore immovably connected with the wheel link. By the unlocking of the holding lugs by way of the closing tongue, the air guiding element can also be removed again from the wheel link so that an exchange can take place in a simple manner, for example, when the air guiding element is defective.

The air guiding element is preferably arranged on the wheel link in such a manner that a section of the element in the area of the longitudinal opening of a rib of the wheel link or a supporting part or a supporting plate, engages in a receiving device of the wheel link. This is used for fixing the air guiding element on the wheel link in the axial direction.

The holding lugs reach, by means of an angularly bent end, around a side of the wheel link. If the wheel link has a rib, the holding lugs reach over this rib, in which case the closing tongue will then be hooked from the inside into one of the holding lugs.

Other objects, advantages and novel features of the present invention will become apparent from the following detailed description of the invention when considered in conjunction with the accompanying drawings.

BRIEF DESCRIPTION OF THE DRAWINGS

FIG. 2 is a view in the direction of the arrow Z of the air guiding element with the wheel link of FIG. 1;

FIG. 3 is a view in the direction of the arrow X in FIG. 2; and

DETAILED DESCRIPTION OF THE DRAWINGS

Figure 1:
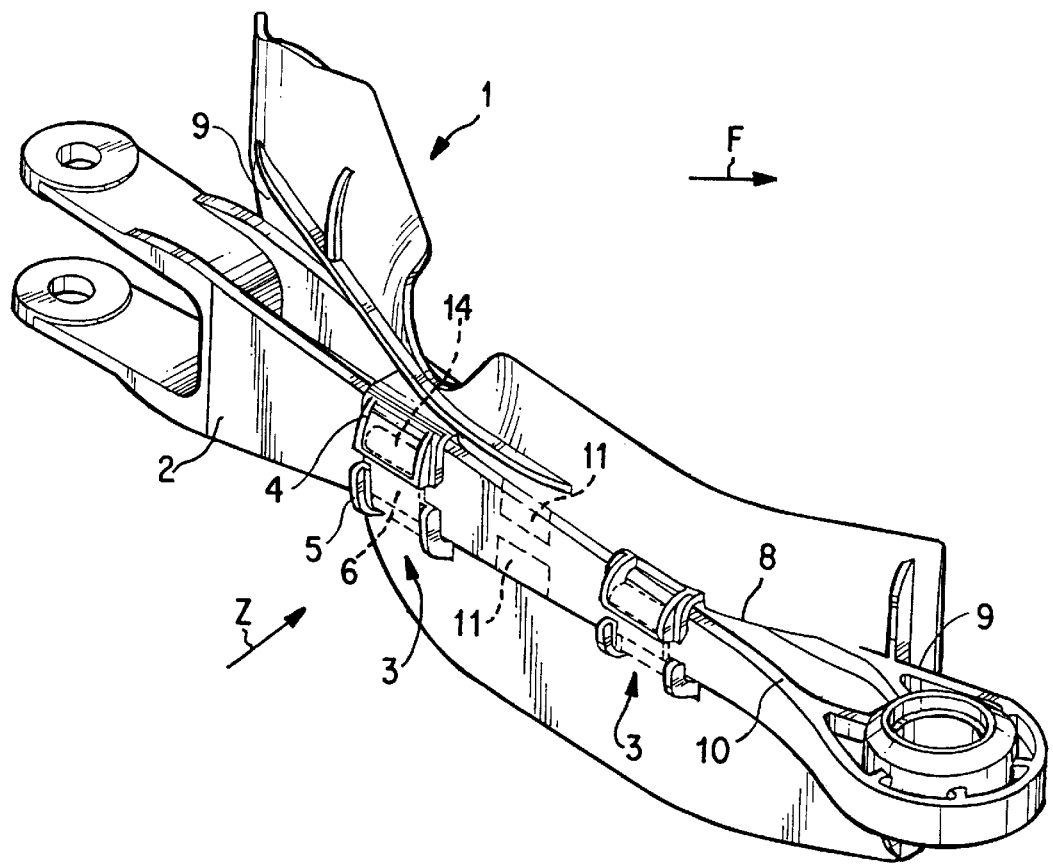
FIG. 1 is a diagrammatic representation of an air guiding element connected with a wheel link and constructed according to a preferred embodiment of the invention.

An air guiding element 1 is fastened to an axle component, such as a swivel bearing or wheel link 2, by means of one or several hook-in connections 3, which can be molded to the air guiding element 1.

As illustrated in detail in FIG. 2, preferably two hook-in connections 3 are provided which each consist of opposite holding lugs 4, 5 and in which case one of the holding lugs 4 or 5 is connected with a closing tongue 6 which can be hooked into a detent opening 7 of the other holding lug 4 o 5.

For the connection with the air guiding element 1, the wheel link 2 is situated in a receiving opening 8 of the element and is supported on end sides of the opening 8 on remaining surfaces 9 of the element 1.

The wheel link 2 has ribs 10. Angular holding lugs 4, 5 reach around these ribs 10 from one side. Supporting plates 11, which are molded to the air guiding element, extend on the rear side of the ribs 10, which supporting plates 11 engage in receiving devices of the wheel link 2 and cause an axial securing of the air guiding element 1 on the wheel link 2.

The closing tongue is elastically swivellable by way of a film hinge 12 and, on the end side, has a hook 13 which can be hooked into the opening 7. For this purpose, this hook 13 is constructed with a wedge 14, a reaching behind the wedge 14 having to take place.

For connecting the elastic air guiding element 1 with the wheel link 2, the element 1 is bent open about its longitudinal axis so far that the wheel link 2 is guided through between the holding lugs 4, 5 and can be placed in the receiving opening 8. Then the element 1 takes up a starting position again in such a manner that the holding lugs 4, 5 reach firmly around the wheel link 2 from the outside so that the closing tongue 6 can be hooked by means of the hook 13 into hook-in opening 7. This hooking-in takes place virtually at the moment at which the air guiding element 1 takes up the starting position again. By means of the bending-open of the air guiding element 1, an unhooking and therefore a replacing of the air guiding element 1 in the case of a defect becomes possible.

Figure 4:
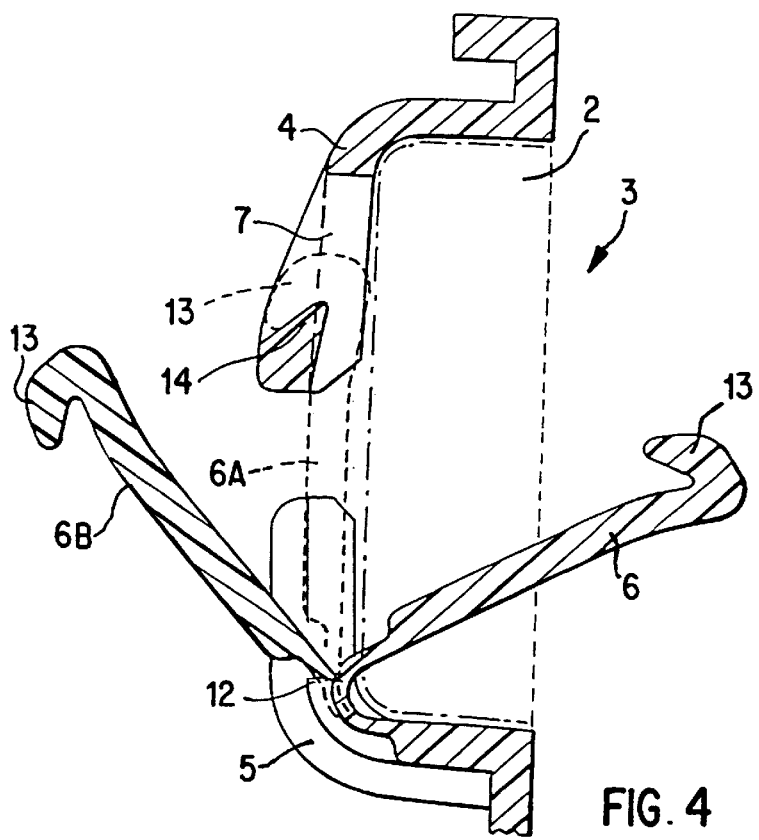
FIG. 4 is a sectional view taken along Line I—I of FIG. 2.

FIG. 4 schematically depicts three positions of the closing tongue 6. The solid line showing depicts tongue 6 in a rest unflexed position corresponding to the elastic air guiding element 1 being separate from any wheel link. Dash line showing of the tongue 6A depicts a hooked in position clamping the air guiding element 1 to the wheel link 2. Solid line showing of the tongue 6B depicts a released position accommodating removal of the element from the wheel link 2. The film hinge 12 is configured to accommodate movement of the closing tongue 6 between the three positions depicted in FIG. 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air guiding arrangement for cooling wheel brakes of a motor vehicle, comprising:
    a contoured deflection element which in use is set against an arriving air flow, is supported at a vehicle side by an axle component part, and guides the air flow to a brake,
    at least one molded-on hook-in connection on the deflection element which is configured to detachably connect the deflection element to the axle component part,
    two opposing holding lugs included in each hook-in connection which reach around the axle component part, and
    a closing tongue connected to one of said holding lugs which locks into the other of said holding lugs,
    each of said holding lugs having an angular construction and reaching around surfaces of the axle component part, the other of said holding lugs including a snap-in opening for receiving the closing tongue to secure the two holding lugs with one another.

2. Arrangement according to claim 1, wherein the deflection element has a longitudinally extending receiving opening which, on both sides, is adjoined by supporting surfaces for the axle component part, and each of the holding lugs is molded to an edge side of the receiving opening.

3. Arrangement according to claim 2, wherein the closing tongue can be pivoted into and hooked in the snap-in opening.

4. Arrangement according to claim 3, and further comprising a film hinge at a first end of said closing tongue about which said closing tongue can swivel, an end-side hook at a second end of said closing tongue for locking into the snap-in opening, and a wedge in the snap-in opening of the other of the holding lugs over which the hook passes.

5. Arrangement according to claim 4, wherein the deflection element is elastically bendable for insertion of the axle component part in the receiving opening and springs back into a starting position for connection of the deflection element to the axle component part.

6. Arrangement according to claim 3, and further comprising at least one supporting plate molded onto at least one edge of the receiving opening between the two holding lugs and axially secured by engagement with the axle component part.

7. Arrangement according to claim 3, wherein the deflection element is elastically bendable for insertion of the axle component part in the receiving opening and springs back into a starting position for connection of the deflection element to the axle component part.

8. Arrangement according to claim 2, and further comprising a film hinge at a first end of said closing tongue about which said closing tongue can swivel, an end-side hook at a second end of said closing tongue for locking into the snap-in opening, and a wedge in the snap-in opening of the other of the holding lugs over which the hook passes.

9. Arrangement according to claim 8, and further comprising at least one supporting plate molded onto at least one edge of the receiving opening between the two holding lugs and axially secured by engagement with the axle component part.

10. Arrangement according to claim 8, wherein the deflection element is elastically bendable for insertion of the axle component part in the receiving opening and springs back into a starting position for connection of the deflection element to the axle component part.

11. Arrangement according to claim 3, and further comprising at least one supporting plate molded onto at least one edge of the receiving opening between the two holding lugs and axially secured by engagement with the axle component part.

12. Arrangement according to claim 11, wherein the deflection element is elastically bendable for insertion of the axle component part in the receiving opening and springs back into a starting position for connection of the deflection element to the axle component part.

13. Arrangement according to claim 2, wherein the deflection element is elastically bendable for insertion of the axle component part in the receiving opening and springs back into a starting position for connection of the deflection element to the axle component part.

14. Arrangement according to claim 13, wherein the deflection element is a unitary elastic plastic member.

15. Arrangement according to claim 1, wherein the closing tongue can be pivoted into and hooked in the snap-in opening.

16. Arrangement according to claim 1, wherein the deflection element is a unitary elastic plastic member.

* * * * *